United States Patent [19]
Kleppner et al.

[11] Patent Number: 5,662,089
[45] Date of Patent: Sep. 2, 1997

[54] DEVICE FOR SUPPLYING FUEL FROM SUPPLY CONTAINER TO INTERNAL COMBUSTION ENGINE OF A MOTOR VEHICLE

[75] Inventors: Stephan Kleppner, Bretton; Kurt Frank, Schorndorf; Dieter Schreckenberger, Marbach, all of Germany

[73] Assignee: Robert Bosch GmbH, Stuttgart, Germany

[21] Appl. No.: 674,155

[22] Filed: Jul. 1, 1996

[30] Foreign Application Priority Data

Aug. 26, 1995 [DE] Germany ............. 1 95 31 467.0

[51] Int. Cl.⁶ .................................................. F02M 37/04
[52] U.S. Cl. ........................ 123/510; 123/509; 137/576
[58] Field of Search ............................. 123/509, 510, 123/514, 516; 137/565, 576, 572

[56] References Cited

U.S. PATENT DOCUMENTS

| 4,305,416 | 12/1981 | Henning | 137/576 |
| 4,651,701 | 3/1987 | Weaver | 123/509 |
| 5,040,516 | 8/1991 | Haraguchi | 137/565 |
| 5,078,167 | 1/1992 | Brandt | 137/510 |
| 5,103,793 | 4/1992 | Riese | 123/509 |
| 5,195,494 | 3/1993 | Tuckey | 123/510 |
| 5,469,829 | 11/1995 | Kleppner | 123/510 |
| 5,520,156 | 5/1996 | Brunnhofer | 123/510 |

FOREIGN PATENT DOCUMENTS

| 4242242A1 | 6/1994 | Germany. | |
| 0015756 | 1/1983 | Japan | 123/509 |
| 2191862 | 7/1990 | Japan | 123/509 |

*Primary Examiner*—Carl S. Miller
*Attorney, Agent, or Firm*—Michael J. Striker

[57] ABSTRACT

A device for supplying an internal combustion engine of a motor vehicle with a fuel from a supply container has a fuel feeding aggregate arrangable in the supply container for supplying the fuel through a feeding line, a fuel filter through which the fuel passes, a holder mountable on the supply container, with the fuel filter arranged on the holder and having a clean-side outlet and feeding line integrated in the holder, and a connecting pipe which is arranged outside of the holder and to which the clean-side outlet of the filter is connected through the integrated feeding line.

6 Claims, 3 Drawing Sheets

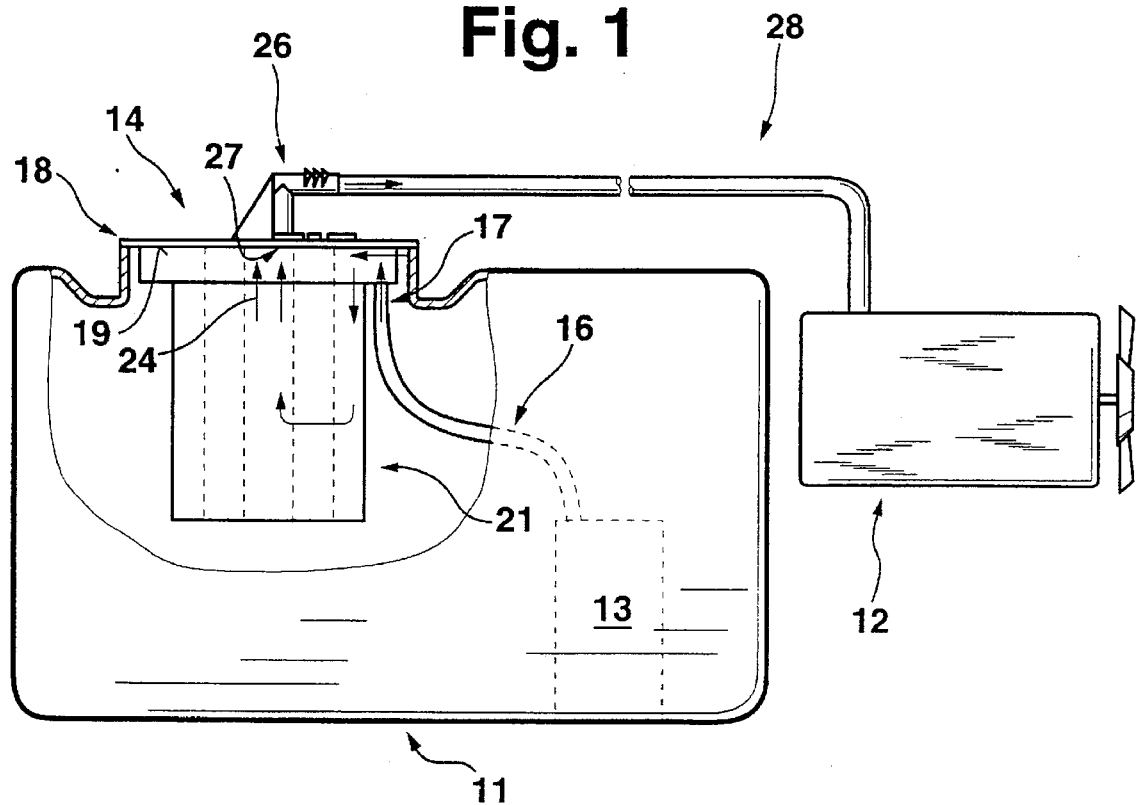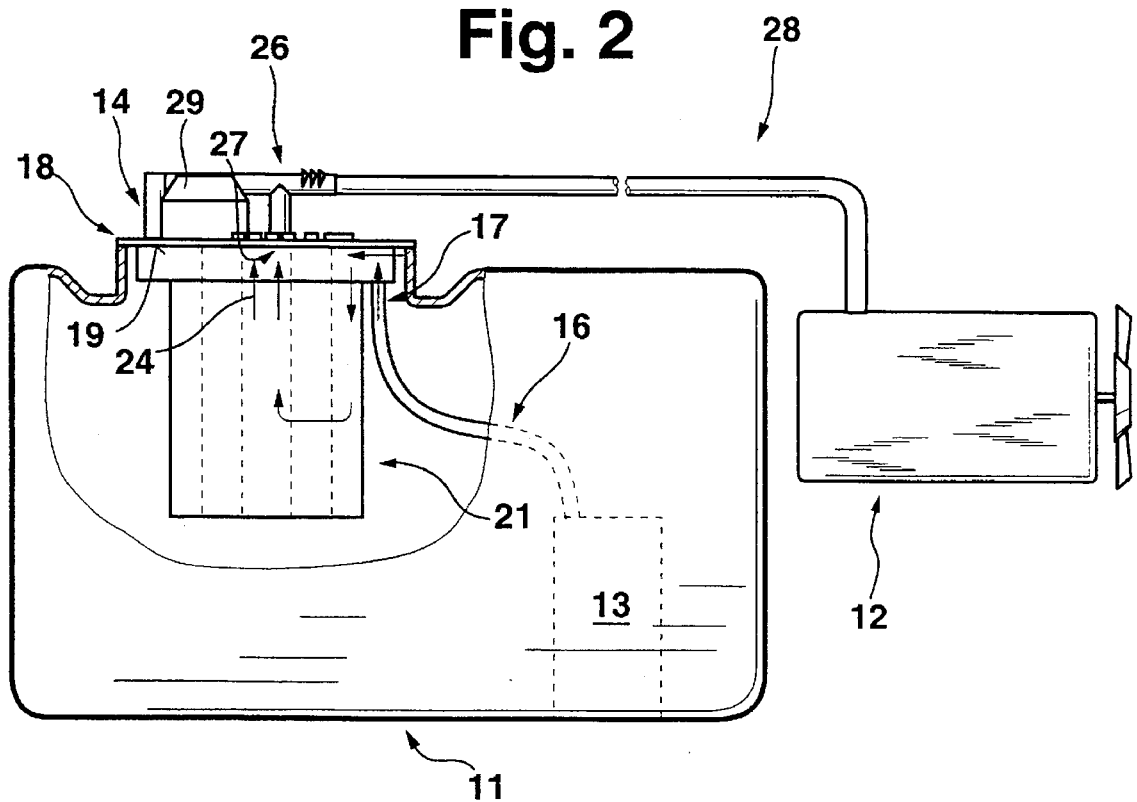

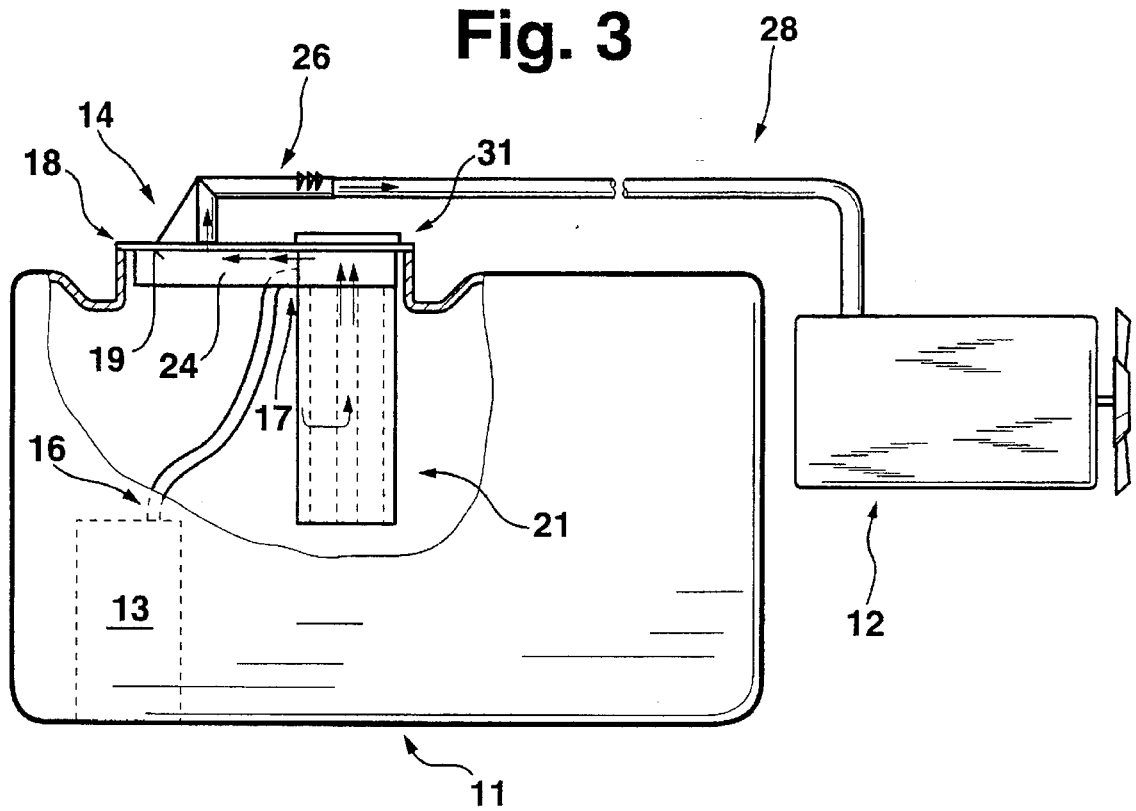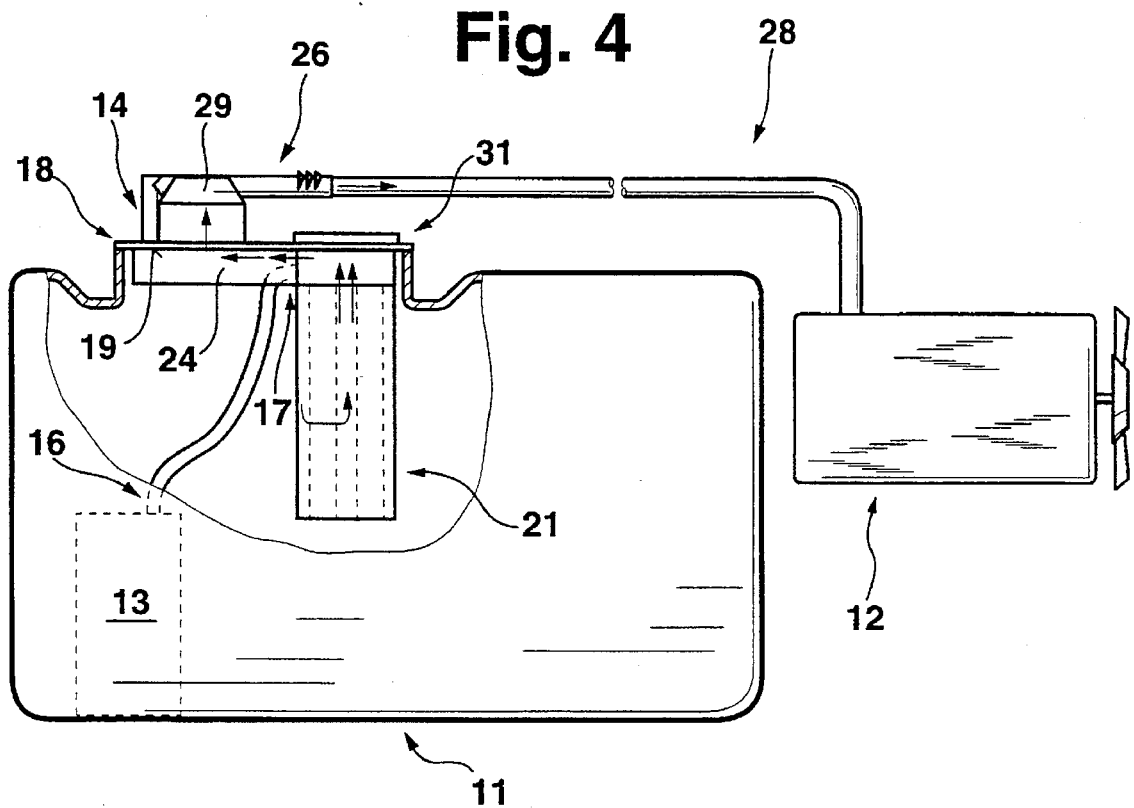

DEVICE FOR SUPPLYING FUEL FROM SUPPLY CONTAINER TO INTERNAL COMBUSTION ENGINE OF A MOTOR VEHICLE

BACKGROUND OF THE INVENTION

The present invention relates to a device for supplying internal combustion engine of a motor vehicle with a fuel from a fuel container.

Devices of the above mentioned general type are known in the art. One of such devices is disclosed for example in the German Patent Document DE 42 42 242 A1. The device has a supply tank from which the fuel is supplied to an internal combustion engine. A fuel supply aggregate is located in the fuel container and supplies the fuel to the internal combustion engine, and a fuel filter is arranged along the fuel feeding path. A holder is provided in the fuel supply container, and both the fuel supply unit as well as the fuel filter are arranged on the holder to form together a unit mountable in the fuel supply container. Such an aggregate for receiving the fuel supply unit as well as the fuel filter and in some cases further components provide for a substantial mounting simplification. However, such an aggregate requires an expensive adjustment and design for receiving the components.

SUMMARY OF THE INVENTION

Accordingly, it is an object of the present invention to provide a device for supplying fuel from a supply container to an internal combustion engine of a motor vehicle, which avoids the disadvantages of the prior art.

In keeping with these objects and with others which will become apparent hereinafter, one feature of the present invention resides, briefly stated, in a device for supplying an internal combustion engine of a motor vehicle with the fuel from a fuel container, in which a holder mountable on the fuel supply container is provided, and a fuel filter is arranged on the holder and has a clean-side inlet connectable with a connecting part which is arranged outside the holder integrated in a feeding path.

When the device is designed in accordance with the present invention, a simple arrangement and mounting of the fuel filter on a supply container with the holder mountable thereon is possible. Because of a feeding path integrated in the holder between the fuel filter and a connecting part arranged outside the supply container on the holder, a simple and fast exchange of the fuel filter is provided without a hose mounting.

When the holder is designed in accordance with present invention for receipt of the fuel filter, a flatly structured fuel container can operate. The fuel supply unit is arrangeable in a suitable position inside the fuel container, so that independently from which geometry of the fuel container, a reliable supply of the internal combustion engine of a motor vehicle with the fuel from the fuel container is possible.

With the inventive feeding path formed in the holder between the connecting part located outside the holders and the fuel filter, in addition an inexpensive arrangement is provided without use of additional hose parts for its connections.

In accordance with the present invention, a feeding pressure regulator is arranged between the fuel filter and the connecting parts in the feeding path. A location of the feeding pressure regulator can be provided by a placement of the holder close to the motor. This has the advantage that only such quantity of fuel is supplied to the internal combustion engine which is actually required for the operation of the combustion engine. The remaining fuel quantity is retained in the fuel tank. Therefore through-flow conduit for the return of an excess quantity of the supplied fuel of the internal combustion engine into the fuel container is dispensed with. As a result, a cost favorable embodiment can be provided.

In accordance with a further highly advantageous embodiment of the invention, the fuel filter is insertable from outside into the supply container and mountable on the holder. As a result, a simple and fast mounting or dismounting of the fuel filter can be provided in definite exchange intervals.

In accordance with still a further advantageous embodiment of the present invention, the fuel filter mountable on the holder is provided with a housing having at least one ring groove associated with a dirt-side supply. With this arrangement, the simple mounting and dismounting of the fuel filter can be provided. Because of the ring groove, a reliable connection between the dirt-side supply of the holder and the supply opening of the filter housing is provided, independently from the radial arrangement and orientation of the fuel filter in the holder.

In accordance with still a further feature of the present invention, the arrangement of at least one ring groove is provided at the clean-side outlet of the fuel filter towards the feeding path which leads to the connecting pipe arranged outside the holder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic view showing a holder with a fuel filter of a device for supplying an internal combustion engine of a motor vehicle with fuel from a fuel tank, in accordance with the present invention;

FIG. 2 is a section taken in FIG. 1 and showing a feeding pressure regulator integrated in the feeding path;

FIG. 3 is a view schematically showing an alternative embodiment of the inventive device for supplying an internal combustion engine of a motor vehicle in accordance with the present invention;

FIG. 4 is a view schematically showing the section of FIG. 3 with a feeding pressure regulator integrated in a feeding path;

DESCRIPTION OF PREFERRED EMBODIMENTS

Figure 5:
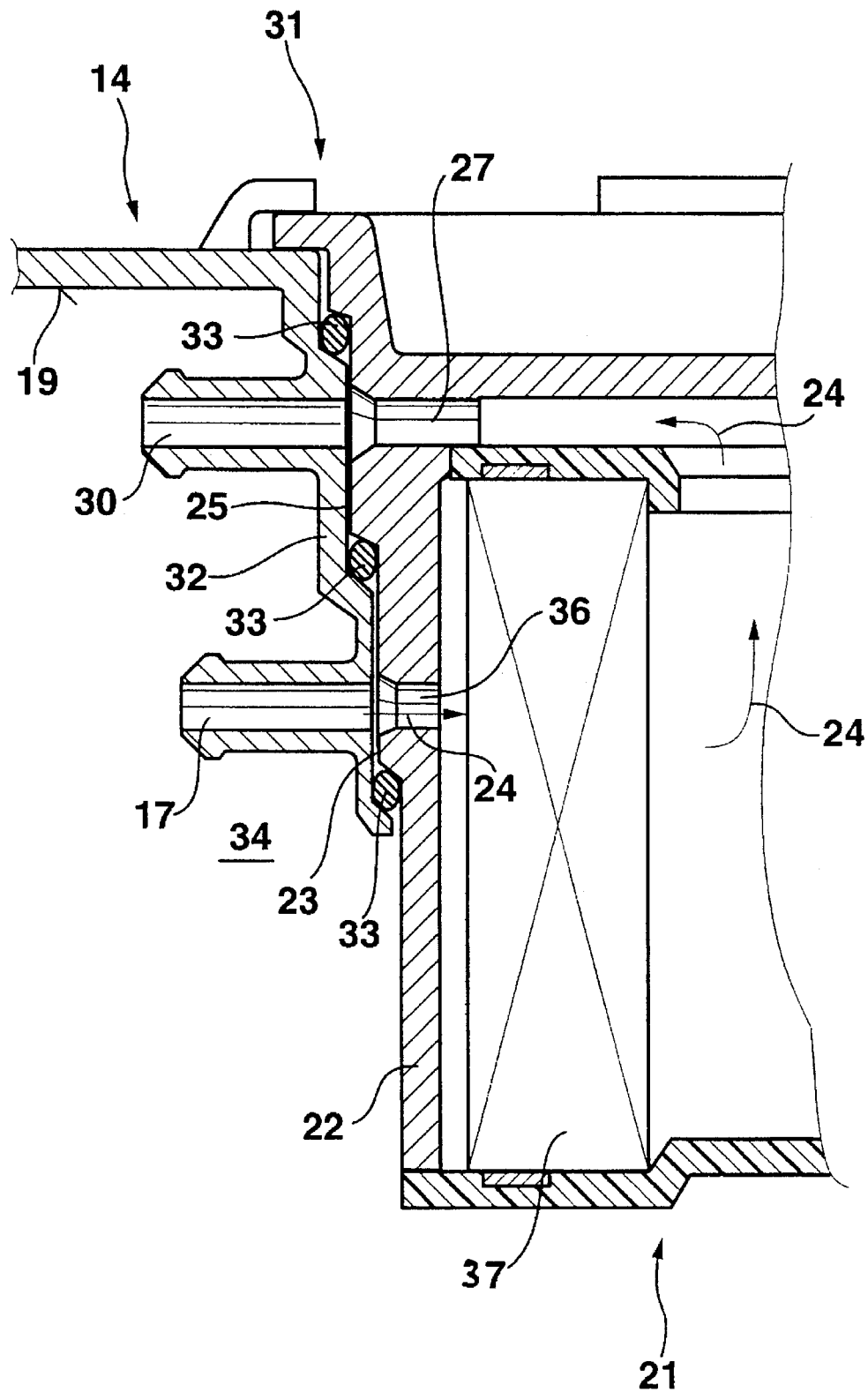
FIG. 5 is a schematic section of a holder with an integrated feeding path and a fuel filter inserted in it of the inventive device.

FIG. 1 shows a fuel container 11 which contains a fuel to be supplied to an internal combustion machine 12. For this purpose a fuel of feeding aggregate 13 is located in the supply container 11. A holder 14 is arranged on the fuel supply container 11, and the fuel feeding aggregates 13 is connected with the holder 14 through a first feeding line 16. The first feeding line 16 is formed by a hose conduit which is connectable with a supply 17 on the holder 14.

The holder 14 is insertable in an opening 18 of the fuel container 11 from outside. It closes the fuel container 21 in fluid-tight and vapor-tight manner. Preferably, a sealing element is provided between the opening 18 of the fuel container 11 and the holder 14.

The holder 14 has a side 19 facing the interior of the fuel container 11 and provided with a fuel filter 21. The fuel-filter 21 has a hosing 22 with a circumferential angular groove 23 shown in FIG. 5. The angular groove 23 communicates with the supply 17 of the holder 14. The fuel supply through the first feeding line 16 to the fuel filter 21 passes through the filter in direction of the arrow 24 and is directed to a connecting pipe 26 arranged outside of the fuel container 11 on the holder 14. A clean-side outlet 27 of the fuel filter 21 is located directly opposite to the connecting pipe 26. Therefore, a hose mounting between the fuel filter 21 and the holder 14.

With this inventive arrangement, a second feeding line integrated in the holder 14 and leading through the fuel filter 21 is provided in accordance with the arrow 24. It extends from the supply 17 to the connecting pipe 27, and a part of the second feeding line 24 is formed by the fuel filter 21. Fixed supply and discharge portions are provided before and after the fuel filter 21 in the holder 14 and formed directly in it. Therefore a fast mounting and a cost saving is obtained, because the hose mounting is dispensed with.

Alternatively, two or more fuel filters 21 can be arranged in the holder 14. They supply the cleaned or filtered fuel through the feeding line integrated in the holder 14 to a joint connecting pipe 26 which leads the fuel through a hose 28 to the internal combustion engine 12. It is to be understood that also several connecting pipes 26 can be provided, and the hose conduits 28 leading to the internal combustion can be connected with them.

The fuel filter 21 is arranged with its longitudinal side along the longitudinal side of the holder 14 which is, for example, round. Similarly, the connecting pipe 26 is arranged in or near the longitudinal axis of the holder 14. Therefore, a short feeding line can be obtained between the clean-side outlet 27 of the fuel filter 21 and the connecting pipe 26.

The fuel filter 21 is arranged exchangeably on the inner side 19 of the holder 14. For this purpose arresting, snapping, clamping or screw connections or the like can be provided, to ensure a simple mounting and dismounting of the fuel filter 21. Preferably, a sealing element is provided between the holder 14 and the fuel container 21 to guarantee that the dirt side is separated from the clean side.

It is also advantageous that the holder 14 formed as a tank flange with the fuel filter 21 arranged on it, can be located in any position on the fuel container 11. Due to the separate arrangement of the fuel filter to the fuel supply aggregate 13, it is possible to operate the flatly designed fuel container 11, and simultaneously a simple and inexpensive arrangement can be provided. The holder 14 is advantageously formed as a simple injection molded part. The components 24 which form the second feeding line as well as not shown connecting elements for receiving the fuel filter 21 can be formed on the holder 14 and integrated on it.

FIG. 2 shows an alternative embodiment of the inventive device. In this embodiment the feeding pressure regulator 29 is additionally provided in the second feeding line 24. It is located immediately outside the fuel container 11 on the holder 14. The feeding pressure regulator 29 regulates the system pressure. Since it is arranged on the holder 14, only the actually required quantity of fuel is supplied to the internal combustion engine 12. The return conduit for excessive quantity of fuel supplied to the internal combustion engine 12 can be dispensed with.

FIG. 3 shows still another embodiment of the inventive device. The fuel filter 21 is insertable from outside into a recess 31 of the holder 14. Therefore, a good accessibility from outside is provided for mounting and dismounting of the fuel filter 21 in defined exchanged intervals. Due to the advantageous embodiment of the ring grooves 23, 25 formed between the recess 31 and the holder 14 and the housing 22 of the fuel filter 21 as shown in FIG. 5, the fuel filter 21 can be arranged on the holder 14 in any position as considered in the radial orientation.

The connecting pipe 26 of the holder 14 is arranged off the center on the holder 14. Therefore, a good accessibility for the withdrawal and insertion of the fuel filter 21 in the recess 31 of the holder 14 is provided. The holder 14 at the side 19 facing toward the interior of the fuel container 11 has hydraulic connecting conduits formed of one piece with the holder 14. They form an inner hydraulic connection or feeding line integrated from the supply 17 to the connecting pipe 26.

FIG. 4 shows an advantageous embodiment of the device in FIG. 3, in which analogously to FIG. 2, the feeding pressure regulator 29 is integrated directly in the second feeding line 24 and located between the connecting pipe 26 of the fuel container 21. Therefore, advantages provided by the device of FIG. 2 are obtained here as well.

FIG. 5 schematically shows the second feeding line 24 of FIG. 3 between the recess 31, the holder 14 and the fuel filter 29. The recess 31 of the holder 14 has a substantially cylindrical collar 32 in the interior of the fuel container 11. The collar 32 gradually reduces toward the interior of the fuel container 11 in a stepped manner. The hosing 22 of the fuel filter 21 insertable in the recess 31 have a stepped narrowing substantially corresponding to the collar 32. Therefore, in the mounted condition, circumferential ring groove 23 and 24 are formed between the collar 32 and the housing 22. A sealing element 33 is provided on each stage. Therefore a fluid-tight and vapor-tight sealing with respect to a dirty side 34 as well as sealing between the ring groove 23 and 25 and the fuel container 11 is provided. The sealing element 33 can be composed of NBR, Viton and the like.

A supply opening 36 is provided in the housing 22. Its position can be arranged independently from the supply 17 due to the design of the ring groove 23. The same is true for the clean-side outlet 27 of the housing 22 which opens in the ring groove 25 and communicates with the connecting pipe 26 through the outlet opening 30. The outlet opening 30 can be connected as a solid pipe piece directly with the connecting pipe 26 and formed of one piece of with the holder 14 so to form the integrated feeding line 24. Alternatively, a hose member can be arranged between the outlet opening 30 and the connecting pipe 26.

The fuel filter can be arranged in the recess 31 by a screwing, arresting, or clamping connection. Furthermore, the fuel filter 21 is provided with filter elements 37 arranged in the hosing 22, as well known in the art.

It will be understood that each of the elements described above, or two or more together, may also find a useful application in other types of constructions differing from the types described above.

While the invention has been illustrated and described as embodied in a device for supplying for supplying fuel from supply container to internal combustion engine of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A device for supplying an internal combustion engine of a motor vehicle with a fuel from a supply container, the device comprising a fuel feeding aggregate arrangeable in the supply container, for supplying the fuel through a feeding line; a fuel filter through which the fuel passes; a holder mountable on the supply container, said fuel filter being arranged on said holder and having a clean-side outlet, said feeding line being integrated in said holder; and a connecting pipe which is arranged outside of said holder and to which said clean-side outlet of said filter is connected through said integrated feeding line, said fuel filter having a housing with at least supply opening, said holder having a cylindrical portion in which said housing is insertable and which is provided with a dirt-side supply and with an outlet, said supply opening and said outlet opening being arranged in the region of said portion, a ring groove arranged between said housing and said holder and communicating said supplying opening of said housing with said dirt-side supply of said holder, and a second groove provided between said housing and said holder and communicating said clean-side outlet of said housing with said outlet of said holder, said firstmentioned ring groove being arranged between said portion of said holder and said supply opening while said second ring groove is arranged between said portion of said holder and said clean-side outlet.

2. A device as defined in claim 1, wherein said holder has a side facing the supply container, said fuel filter having a closed hosing mounted on said side of said holder.

3. A device as defined in claim 1, wherein said holder has a recess, said fuel filter being insertable in the fuel container from outside in said recess of said holder.

4. A device as defined in claim 1; and further comprising a feeding pressure regulator arranged in said feeding line between said fuel filter and said connecting pipe.

5. A device as defined in claim 1; and further comprising sealing means arranged between said housing and said holder in said ring groove.

6. A device as defined in claim 1, wherein said holder with said fuel filter are formed so that they are mountable on the fuel container in any radial position.

* * * * *